June 11, 1957     E. L. CRANDALL     2,795,640
ELECTRICAL CABLE SUBJECT TO IRRADIATION
Filed Feb. 1, 1956
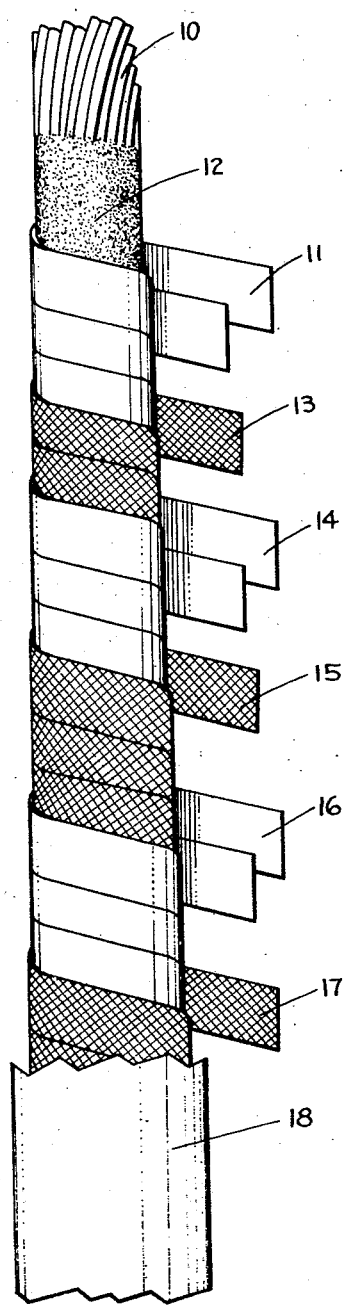
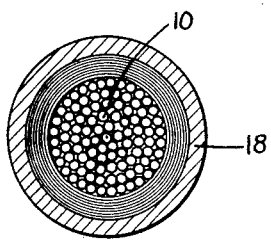
Inventor:
Eugene L. Crandall
by Allard A. Braddock
His Attorney 2,795,640
Patented June 11, 1957

2,795,640

ELECTRICAL CABLE SUBJECT TO IRRADIATION

Eugene L. Crandall, Fairfield, Conn., assignor to General Electric Company, a corporation of New York Application February 1, 1956, Serial No. 562,696

6 Claims. (Cl. 174—120)

The present invention relates to electrical cables and particularly to a cable insulated with silicone-resin-impregnated glass tapes which are to be used in regions of rather high levels of radiation intensity. When electrical equipment is installed to operate in regions where radiation intensities can be at high levels, the electrical cable supplying such equipment is subjected to this radiation and frequently to high temperatures also, to moisture, and to mechanical working or handling during the installation of the equipment. It is known that radiation drastically degrades most insulating materials either physically or electrically, or both.

Glass fibers are resistant to damage from radiation and it has been found that glass cloth impregnated with any of the conventional silicone resins available on the market makes an insulating tape which has very reasonable characteristics under the temperature and radiation conditions that might be imposed on such cable. Like so many other insulating materials, silicone-resin-impregnated glass cloth also emits a gas when subjected to radiation. The pressure of this gas that is being built up in the cable must be taken into account in the design of such cable.

I have found that by incorporating an open-weave glass tape at several different layers within the plurality of layers of silicone-resin tapes, I have been able to dissipate the gases that are generated in cable exposed to radiation, thereby preventing excessive pressure build-up in the cable. In order to prevent silicone-resin-treated glass tapes from cracking and crazing when subjected to mechanical bending, I use mica dust over the bare conductor as well as between the various layers of tapes. This mica dust acts as a lubricant and allows the tapes to slide over each other when the cable is bent. In addition to serving as a lubricant, the mica dust, together with the open-weave glass tape, prevents the silicone-resin-coated glass tapes from sticking together when subjected to temperatures above 100° C.

The principal object of this invention is to provide an electrical cable with a silicone-resin-impregnated glass tape insulation and means to dissipate excessive gas pressures which would otherwise be produced when the cable is subjected to irradiation.

A further object of this invention is to provide a silicone-resin-impregnated glass insulated cable with various layers of open-weave glass tapes to form longitudinal passages within the cable for the escape of undesirable gases built up in the cable when it is subjected to irradiation.

A still further object of this invention is to provide electrical cable with a silicone-resin-impregnated glass insulating medium separated by various layers of open-weave glass tape and having mica dust as a lubricant and a metal sheath for protection from moisture, high tempertures, rough handling, and shifting during operation.

My invention will be better understood from the following description taken in connection with the accompanying drawing, and its scope will be pointed out in the appended claims.

Fig. 1 is a broken view of cable in accordance with this invention wherein the various layers of tape have been partially unwrapped in order to reveal the structure; and Fig. 2 is a sectional view of the cable of Fig. 1.

The cable comprises a conducting core 10, which may be composed of a multiplicity of strands as shown, around which is wrapped an impervious silicone-resin-impregnated woven glass tape 11. The cable preferably has a portion of the space between the conductor 10 and tape 11 filled with lubricating mica dust 12, as shown in Fig. 1.

Overlying the impervious tape 11 is a spirally wound layer of open-weave or wide-mesh glass tape 13 which, in turn, is enwrapped with a layer of spirally wound impervious silicone-resin-impregnated woven glass tape 14. The impervious tape 14 has a layer of open-weave glass tape 15 wrapped around it, and this layer is enclosed in an outer layer of spirally wrapped impervious silicone-resin-impregnated woven glass tape 16. Overlying the impervious tape 16 is an outer layer of open-weave glass tape 17, and the entire cable is then sheathed in impervious material 18 which is preferably composed of a metal such as lead, stainless steel, aluminum, or copper.

The open-weave tapes 13, 15, and 17 preferably have their interstitial spaces partially filled with mica dust (not readily illustratable) which aids in the prevention of damage to the impervious layers 11, 14, and 16 during flexing. The impervious layers 11, 14, and 16 are preferably 2-ply, as illustrated, in order to provide the maximum of electrical protection. The wide-mesh tapes 13, 15, and 17 serve the primary purpose of providing longitudinal passageways for the dissipation of any gas which might be evolved from the silicone resin used as an impregnant for the tapes 11, 14, and 16. Thus, the cable of this invention may be used in locations of high intensity radiation, such as nuclear power plants, without rupturing due to an increase of pressure within the cable resulting from the gas evolved when the silicone-resin-impregnant is subjected to nuclear radiation.

While the invention has been described with reference to a particular embodiment thereof, it is obvious that there are many modifications which would still come within the true spirit of the invention. Therefore, the invention should not be narrowed in scope other than as may be necessitated by the scope of the appended claims.

What I claim as new and desire to secure by Letters Patent of the United States is:

1. An electrical cable comprising a conductor insulated by a plurality of layers of glass tapes impregnated with silicone resin, said tapes being separated at various layers by an open-weave glass tape which forms passages throughout the length of the cable for the escape of gases generating from the silicone resin when the cable is subjected to irradiation, and an impervious outer sheath covering the cable.

2. An electrical cable including an electrical conductor, a plurality of layers of glass tapes impregnated with silicone resin, a layer of an open-weave glass tape being interposed between certain groups of silicone-resin tapes for the dissipation of gases generated by the silicone resin when the cable is subjected to irradiation, mica dust partially filling the space between the conductor and inner layer of tape as well as the interstitial spaces of said open-weave glass tape, and a high temperature and moisture resistant metal sheath enclosing the said layers of tape and conductor.

3. An electrical cable comprising an electrical conductor, a plurality of layers of woven glass tape impregnated with silicone resin spirally wound around said conductor, a layer of open-weave glass tape spirally wound between said layers of silicone-resin-impregnated tape, said open-weave tape providing longitudinal passageways for the dissipation of gases evolved when said silicone resin is subjected to irradiation, and a heat stable impervious sheath enclosing said layers of tape and conductor.

4. An electrical cable comprising an electrical conductor, a plurality of layers of woven glass tape impregnated with silicone resin spirally wound around said conductor, a layer of open-weave glass tape spirally wound between said layers of silicone-resin-impregnated tape, said open-weave tape defining a plurality of passageways for the longitudinal flow of gases evolved when said silicone resin is subjected to irradiation, lubricating mica dust partially filling the space between said conductor and the inner layer of impregnated silicone resin tape and also the interstitial spaces of said open-weave glass tape, and an impervious metal sheath enclosing the said layers of tape and conductor.

5. An electrical cable comprising an electrical conductor, a first layer of impervious silicone-resin-impregnated woven glass tape spirally wrapped around said conductor, a first layer of open-weave glass tape spirally wrapped around said first layer of resin-impregnated tape, a second layer of impervious silicone-resin-impregnated woven glass tape spirally wrapped around said first layer of open-weave glass tape, a second layer of open-weave glass tape spirally wrapped around said second layer of resin-impregnated tape, a third layer of impervious silicone-resin-impregnated woven glass tape spirally wrapped around said second layer of open-weave glass tape, a third layer of open-weave glass tape spirally wrapped around said third layer of resin-impregnated tape, and an impervious metal sheath enclosing the said layers of tape and conductor.

6. An electrical cable comprising an electrical conductor, a first layer of impervious silicone-resin-impregnated woven glass tape spirally wrapped around said conductor, a first layer of open-weave glass tape spirally wrapped around said first layer of resin-impregnated tape, a second layer of impervious silicone-resin-impregnated woven glass tape spirally wrapped around said first layer of open-weave glass tape, a second layer of open-weave glass tape spirally wrapped around said second layer of resin-impregnated tape, a third layer of impervious silicone-resin-impregnated woven glass tape spirally wrapped around said second layer of open-weave glass tape, a third layer of open-weave glass tape spirally wrapped around said third layer of resin-impregnated tape, lubricating mica dust partially filling the space between said conductor and said first layer of resin-impregnated tape and also partially filling the interstitial spaces of both layers of said open-weave glass tape, and an impervious metal sheath enclosing the said layers of tape and conductor.

References Cited in the file of this patent

FOREIGN PATENTS 558,033    Great Britain _____ Dec. 16, 1943

OTHER REFERENCES

Modern Plastics, March 1946, pages 160–162. (Copy in Scientific Library and in Division 69.)